United States Patent [19]

Strien et al.

[11] 4,165,126
[45] Aug. 21, 1979

[54] ADJUSTABLE VEHICLE SEAT BOTTOM

[75] Inventors: Werner Strien, Stuttgart-Heumaden; Rudolph Zwanziger, Erkenbrechtsweiler; Ernst Kaufmann, Stuttgart, all of Fed. Rep. of Germany

[73] Assignee: Recaro GmbH & Co., Kirchheim, Fed. Rep. of Germany

[21] Appl. No.: 933,952

[22] Filed: Aug. 15, 1978

[30] Foreign Application Priority Data

Sep. 6, 1977 [DE] Fed. Rep. of Germany ....... 2739999

[51] Int. Cl.² ............................................. A47C 7/02
[52] U.S. Cl. .................................. 297/284; 297/452; 297/458
[58] Field of Search ............... 297/284, 311, 312, 452, 297/458, 219

[56] References Cited

U.S. PATENT DOCUMENTS

| | | | |
|---|---|---|---|
| 423,698 | 3/1890 | Plimsoll | 297/284 X |
| 3,167,351 | 1/1965 | Butler | 297/219 |
| 3,600,037 | 8/1971 | Lohr | 297/312 |
| 3,883,173 | 5/1975 | Shephard et al. | 297/284 X |
| 4,018,477 | 4/1977 | Hogan | 297/284 |

*Primary Examiner*—Francis K. Zugel
*Attorney, Agent, or Firm*—Wigman & Cohen

[57] ABSTRACT

A vehicle seat having a subdivided adjustable seat bottom portion is disclosed. The seat bottom includes front and rear upholstery sections, the former of which is longitudinally adjustable in the longitudinal direction of the seat. A form-fitting notch and detent mechanism is provided for securely and selectably locating the front upholstery section relative to the rear section.

6 Claims, 3 Drawing Figures

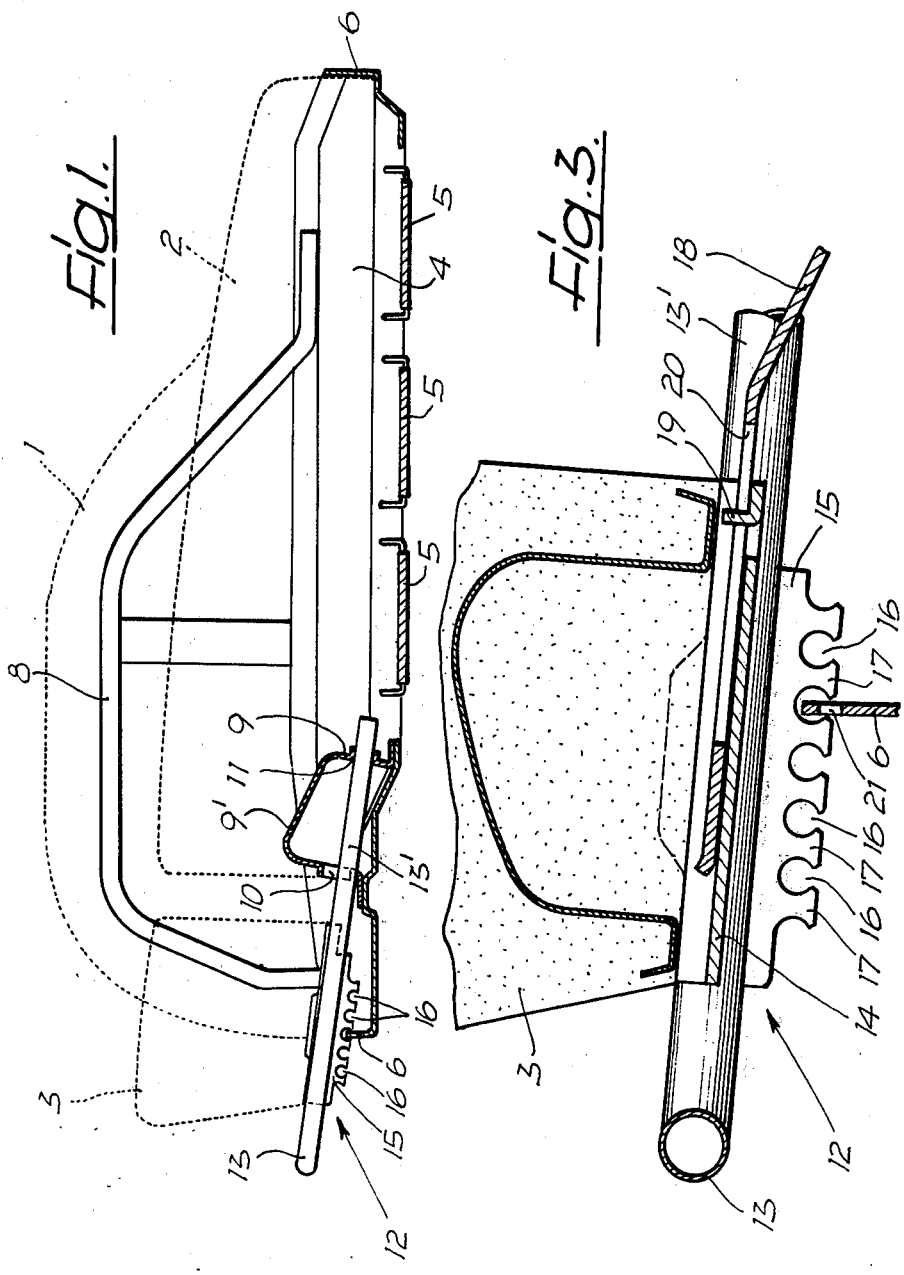

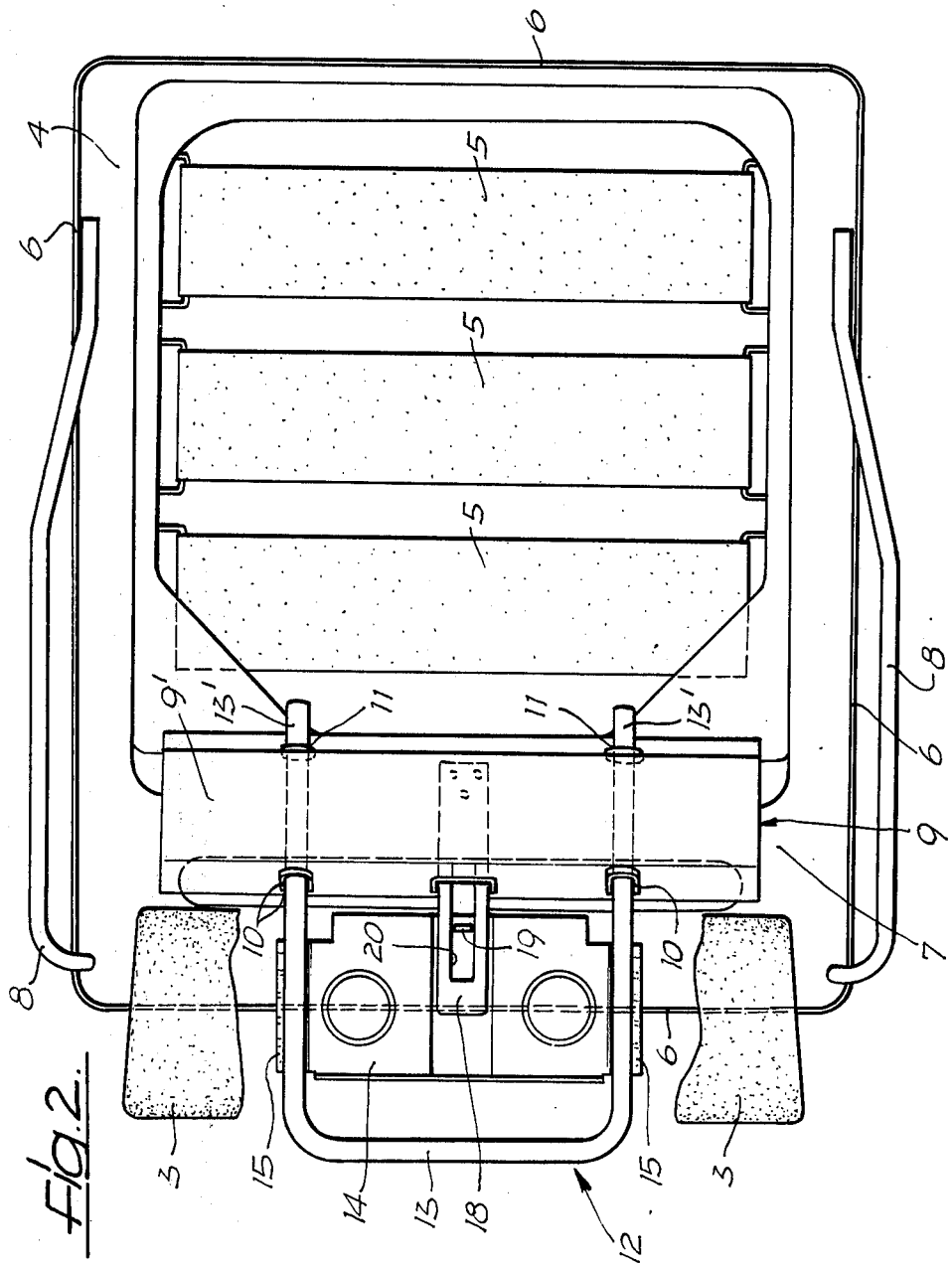

ADJUSTABLE VEHICLE SEAT BOTTOM

BACKGROUND OF THE INVENTION

The present invention relates to a vehicle seat, the bottom portion of which is provided with upholstery which is divided across the width of the seat, the divided upholstery sections being supported by two upholstery supports which are capable of sliding movement relative to each other and of adjustment into selectable positions by means of a latching device. The front upholstery support has two parallel rods which support the front upholstery section, which rods are guided so as to be longitudinally adjustable in guides in the other upholstery support.

In a known vehicle seat of this type, for example, as disclosed in German Patent Specification DT-GM 7340896, the division of the upholstery and the adjustability of the forward upholstery section relative to the rear upholstery section in the longitudinal seating direction provides good support for the thighs of seat users of different sizes, and the adjustment of the seat length also presents no difficulty for the user of the seat. However, under very heavy loads on the seat, such as those which can occur in an accident, the known seat does not assure that the forward upholstery section is not undesirably unintentionally shifted.

SUMMARY AND OBJECTS OF THE INVENTION

A primary objective of the invention, therefore, is to provide a vehicle seat having adjustable seat length which provides the user of the seat good support even under heavy loads such as may occur in an accident, but which is still simple in construction and easily adjusted. This objective is attained with a seat of the above-mentioned type according to the invention, in that the guides for the two rods are provided by bores in a guide body, such bores having dimensions which permit a slight upward pivoting of the rods. The two rods are attached to a plate which forms the support surface for the front upholstery section, said plate having downwardly bent edge strips which extend parallel to the rods. The downwardly bent edge strips each have a series of downwardly open notches or catch grooves, which, together with the raised front edge of the rear upholstery support, form a notch and detent-type adjustment mechanism.

When the raised front edge of the rear upholstery support engages the notches of the upholstery support for the front upholstery section, the notch and detent device forms a formed-fitted stop against an undesired shifting of the front upholstery support relative to the rear upholstery support, even when the shifting force exerted on the front upholstery support, such as may occur in an accident, is relatively high. Despite this form-fitted engagement of the elements of the notch and detent adjustment mechanism, the seat length is easily adjusted by the user and the cost of the seat length adjustment is relatively low. To adjust the seat length, it is only necessary to pivot the front upholstery support upwardly until the detent notches are disengaged from the raised edge. This pivotal motion is made possible by the guide bores for the two rods and is limited in degree. In the raised position, the front upholstery support can be shifted in the longitudinal direction of the seat. When the desired position is reached an additional downward pivotal movement permits the raised edge to again engage the detent notches. The cost of the seat length adjustment is relatively low because the upholstery support for the front upholstery section and the guide for such upholstery support are formed in an extremely simple manner. Moreover, the notch and detent adjustment mechanism is formed from seat elements which are already present. This is also true for the raised edge which can be provided without any appreciable additional expense, as is also the case for the side edge strips forming the detent notches.

In a preferred exemplary embodiment, the teeth formed by the detent notches have points at the head thereof which are directed toward the neighboring teeth. Holes are provided in the raised front edge for the engagement of the points of the two teeth which are engaged. This achieves an especially simple securing mechanism for the notch and detent adjustment device to protect against an undesired disengagement, because the front upholstery support must first be pushed toward the rear upholstery support by a slight amount to disengage the teeth from the holes before it can be pivoted upwardly.

In order to prevent the seat elements which are moveable relative to each other from folding despite the unavoidable play of the notch and detent device and the two rods in the guide holes, it is sufficient to provide a flat spring which is attached to the upholstery support for the rear upholstery section. This flat spring is pre-biased and extends in the shape of a tongue extending forwardly to the raised edge and is disposed on the upper side of the plate of the front upholstery support. This type of spring also prevents the notch and detent device from becoming disengaged by vibrations.

In a preferred exemplary embodiment, the bores for the guiding of the rods are provided in a strap-like hollow guide body. The guide body is arranged transversely of the seat at a distance from the front raised edge and is attached to the upholstery support which carries the rear upholstery section. This type of hollow body makes the expense for the guide very low, because it can be bent from a sheet in which the guide bores have been previously machined or punched. The use of this type of hollow body also presents no difficulties in pivotally guiding the rods of the front upholstery support, because only the two bores in the side of the hollow body neighboring the raised edge need be formed as oblong holes for this purpose. A further advantage of this type of hollow body is that when it projects above the upper side of the upholstery support which serves to support the upholstery, the danger is substantially decreased that the user of the seat will slide under the saftey belt and forward out of the seat during an accident. This danger exists in common vehicle seats, because, during an accident, the upholstery of the front half of the seat bottom portion is generally so extremely compressed when the person slides forward in the seat, that he may slide through under the lap belt of a safety harness. A ledge-like body which projects upwardly beyond the support surface for the upholstery, in contrast, forms a barrier or stop across the seat. The support effect of this stop on the user of the seat when he begins to slide forward, becomes greater the more the upholstery is compressed. The upholstery in the front half of the bottom portion can, therefore, have a relatively high compressibility, as is desirable for the support of the thighs of the user of the seat.

BRIEF DESCRIPTION OF THE DRAWINGS

The invention is described below in greater detail with the aid of an exemplary embodiment shown in the drawings, wherein:

FIG. 1 is a partial longitudinal section of the exemplary embodiment;

FIG. 2 is a top view of the two upholstery supports of the exemplary embodiment; and FIG. 3 is a cross-section through the front upholstery support.

DETAILED DESCRIPTION OF A PREFERRED EMBODIMENT

A motor vehicle seat provided with a back rest which is formed in a known manner and is, therefore, not described nor shown has a bottom portion provided with a side bolster roll 1. The central upholstery of the bottom portion is completely divided across the seat thus providing a rear upholstery section 2 and a front upholstery section 3. The length of the front upholstery section 3 as measured in the longitudinal direction of the seat is about ¼ of the length of the rear upholstery section 2 in the corresponding direction.

The rear upholstery section 2 is supported by a rear upholstery support 4 which, as shown particularly in FIG. 2, is formed of sheet metal with a central opening in which elastically yielding belts 5 are stretched across the width of the seat, thus forming the suspension for the rear upholstery section 2. The frame has a peripheral, raised edge 6 and a front edge area 7, the latter being wider than the two side edge zones and the rear edge zone of the support 4. Support bars 8 for the bolster rolls are attached to a respective side edge zone of the support 4.

In addition, on the upper side of the front edge zone 7 a strip-like guide body 9 is located, which extends across the width of the seat, that is, parallel to the front section of the raised edge 6 and to the belts 5, and beyond a section of the front edge zone 7, which approximately coincides with the section bounding the central opening in the support 4. The guide body 9 is produced of sheet metal and has a U-shaped downwardly open profile. Outwardly bent lips along the downwardly directed ends of both shanks of the guide body 9 serve for the support and connection thereof to the front edge zone 7. Because the shank of the guide body 9 closest to the front section of the edge 6 lies on a reinforcing rib which is pressed upwardly out of the front edge zone 7, and the other shank lies along the central opening on an edge area which is depressed to form a step, the flat yoke section 9' of the guide body 9, to which both sharply rounded shanks are joined, is inclined towards the rear by about 30° with regard to the plane defined by the upholstery support 4, as shown in FIG. 1. The height of the guide body 9 is chosen so that the plane defined by the yoke section 9' intersects the belt 5 lying closest to the guide body.

Two identical oblong holes 10 are provided in the shank of the guide body 9 nearest the front section of the edge 6 and lie symmetrical to the longitudinal center plane. The longitudinal extension of these oblong holes 10 lies in a plane extending perpendicularly to the front edge zone 7 and parallel to the longitudinal center plane. Circular holes 11 in the other shank of the guide body 9, the lower edge of which lies beneath the lower edge of the oblong holes 10, are aligned with the two oblong holes 10. Both the two oblong holes 10 and the circular holes 11 are machined into the sheet metal before the guide body 9 is bent and in such a manner that an outwardly projecting lip is produced.

The front upholstery section 3, in the upholstery body of which a reinforcing element is disposed, is carried by a front upholstery support 12, which consists of a frame 13 and a frame plate 14. The frame 13 is made of a tubular material with a diameter only slightly smaller than the diameter of the holes 11 and the lip of the oblong holes 10, because the two parallel shanks 13' of the frame 13 are guided in the holes 11 and the oblong holes 10 so as to be longitudinally moveable. Because of the oblong holes 10, it is possible to rotate the frame 13 upward, that is, clockwise as viewed in FIG. 1, whereby the axis of rotation lies on a line which connects the two holes 11, that is, extends parallel to the front edge zone 7. The frame plate 14, to which the two shanks 13' are welded, is essentially rectangular and runs from one shank to the other parallel to the yoke or end portion of the frame 13 and at a distance therefrom. The two shanks 13' each lie in recesses formed on the frame plate 14, to each side of which is connected a rectangularly downwardly bent side edge strip 15.

The two identical edge strips 15 are each provided with a series of circular, equispaced punched notches 16, which are slit to the lower edge of the strip 15 so as to be downwardly open. A half notch is machined into the front and rear ends of the edge strip 15. The teeth 17 formed between the notches 16 are given a widened head by this shape of the notches, each of which head forms two points or hooks which project in one direction or the other along the strip. The length of the series of teeth and thereby the length of the frame plate 14 in the longitudinal direcion of the shanks 13' is determined by the adjustment range for the front upholstery section 3. In addition, the width of the slits between the heads of the neighboring teeth is somewhat larger than the thickness of the front section of the edge 6.

The notches 16 and the teeth 17, together with the front section of the edge 6 comprise the notch and detent adjustment mechanism of the front upholstery support 12. The front section of the edge 6 is therefore provided with two bores 21, each of which is aligned with one of the series of teeth. The diameter of these two bores and their distance from the upper edge of the front section of the edge 6 are chosen so that the points of the heads of the teeth 17 can engage therein when the frame plate 14 bears on the front section of the edge 6 such that the edge 6 engages in one of the notches 16 of each series. After the introduction of the edge 6 into two aligned notches, the front upholstery support 12 need only be pulled slightly forward in order to attain an engagement of the teeth 17 in the two bores 21. Conversely, of course, the front upholstery body 12 must first be pushed slightly rearwardly before it can be rotated upward for the purpose of disengagement.

If the foremost of the teeth 17 is in engagement with the associated bore in the edge 6, then the front upholstery section lies against the front end of the rear upholstery section 2 without any intermediate space and without forming a step. The upper side of the upholstery section 2 in the exemplary embodiment is rearwardly inclined in the area of the side bolster rolls and then runs approximately parallel to the rear upholstery support. Beginning from this position, the front upholstery section 3 can be moved from the rear upholstery section 2, in the exemplary embodiment, in steps of approximately 1 centimeter, up to a maximum of 6 centimeters, whereby the depth or horizontal dimension of these upholstery sections can be enlarged by approximately 6 centimeters. The cleft or space that appears thereby between the rear and front upholstery sections is not disturbing because it is disposed in the area of contact with the thighs and is limited on the sides by the bolster rolls as well. The inclined position of the shank 13' increases the height at which the front edge of the front upholstery section lies above the floor of the vehicle, as the length of the seat is enlarged, which is desirable. The yoke element of the frame 13 can be used as a grip, because it is exposed, whereby an adjustment of the front upholstery section 3 can be performed without difficulty.

In order to prevent the seat from folding as a result of the unavoidable play of the shanks 13' in the bores 10 and 11 and the play in the front section of the raised edge 6 in the grooves 16 of the edge strip 15, a pre-biased flat spring 18 is provided, one end of which is attached to the front edge zone 7. In the exemplary embodiment the spring is attached at a point inside the guide body 9 and extends from such point in the form of a resilient tongue through an opening in the front shank of the guide body 9 toward the front section of the raised edge 6. The front portion of the flat spring 18 is pre-biased and bears against the upper side of the central zone of the frame plate 14. A tongue 19 which is bent upwardly from the frame plate 14 and engages in an elongated slot 20 in the flat spring 18 prevents the front upholstery support 12 from becoming unintentionally drawn beyond the forwardmost position, as well as from separating from the rear upholstery support 4. To effect such separation, it is necessary to lift the flat spring 18.

An unintentional movement of the front upholstery support 12 is also prevented even under heavy loads, such as those that occur during an accident, because the notch and detent device form-fittingly blocks both longitudinal movement and rotational movement of the front upholstery support. In addition, during an accident, the ledge-like guide body 9 prevents the user of the seat from sliding forward out of the seat. If, for example, the user of the seat begins to slide forward on the upholstery of the seat bottom portion during an accident, the upholstery in the front portion, which in the exemplary embodiment is elevated, is so greatly compressed that the guide body acts as an elevation or stop which prevents the sliding of the user from the seat.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. In a vehicle seat including a seat bottom having upholstery which is divided transversely into front and rear sections, said sections being supported by a front and rear upholstery support respectively, the upholstery supports being adjustably slidable relative to each other, means for latching the upholstery supports in selectable relative positions, the front upholstery support having two parallel rods for supporting the front upholstery section, means for guiding the rods so as to be longitudinally shiftable relative to the rear upholstery support, the improvement wherein said guiding means comprise bores formed in the rear upholstery support for receiving said rods, said bores having dimensions which permit limited upward pivotal motion of the rods, said front upholstery support including a plate, said two rods being attached to said plate, said plate having downwardly directed edge strips extending substantially parallel to the rods, said edge strips having a series of downwardly open notches, said rear upholstery support having a raised front edge, said notches and raised front edge defining said latching means.

2. The improvment according to claim 1, wherein said notches define a series of teeth in said edge strips, each tooth comprising a head having pointed portions directed toward neighboring teeth, said raised front edge having holes for engaging the pointed portions of the heads of selected teeth.

3. The improvement according to claim 1, including a pre-biased flat spring attached to the rear upholstery support, said spring being formed in the shape of a tongue and extending forwardly toward said raised edge, said spring bearing on the upper side of said plate.

4. The improvement according to claim 1, wherein said rear upholstery support includes a ledge-like hollow body secured transversely across such support at a spacing from the raised front edge, said bores for guiding the rods being formed in said hollow body.

5. The improvement according to claim 4, wherein said hollow body includes two sides, one of which is arranged adjacent said raised front edge, two of said bores being formed as oblong bores in said one side of the hollow body.

6. The improvement according to claim 4, wherein said hollow body projects above the upper side of the rear upholstery support.

* * * * *